METHOD OF MAKING A HARD-SURFACE ROTOR CONTAINING MAGNETIC TRANSDUCERS

Filed Sept. 12, 1969

INVENTORS
MATTHIAS J. GRUNDTNER
GEORGE E. MELINK

BY Charles A. Johnson
ATTORNEY

United States Patent Office 3,614,831
Patented Oct. 26, 1971

3,614,831

METHOD OF MAKING A HARD-SURFACE ROTOR CONTAINING MAGNETIC TRANSDUCERS

Matthias J. Grundtner, St. Paul, and George E. Melink, Burnsville, Minn., assignors to Sperry Rand Corporation, New York, N.Y.

Filed Sept. 12, 1969, Ser. No. 857,389
Int. Cl. H01f 7/06
U.S. Cl. 29—603 5 Claims

ABSTRACT OF THE DISCLOSURE

A hard-surface rotor in a rotating-head magnetic memory system for maintaining the uniform profile of flexible magnetic record members used in the magnetic memory system and for resisting damage to the rotor resulting from accidental contacting of the flexible magnetic record member with the rotor surface is described. A method for providing a hard-surface coating over an entire rotor peripheral surface, with only the magnetic transducer pole pieces exposed, is also described.

CROSS-REFERENCE TO RELATED APPLICATIONS

The present invention can be utilized in a magnetic recording and reading system as disclosed in co-pending patent application of Gregory J. Ehalt et al., Ser. No. 695,500, filed Jan. 3, 1968, assigned to the assignee of this invention, and is hereby incorporated by reference. The use of various rotor surface configurations for affecting the profile of a flexible magnetic recording member is described in co-pending patent application of George D. Bukovich et al., Ser. No. 695,501, filed Jan. 3, 1968, and now abandoned. The hard-surface rotor of this invention will also find particular advantageous use in the apparatus described and claimed in co-pending patent application of George D. Bukovich et al., Ser. No. 695,502, filed Jan. 3, 1968, now Pat. No. 3,525,087 describing a flexible recording member profile correcting system.

BACKGROUND OF THE INVENTION

(1) Field of the invention

This invention relates generally to the field of magnetic recording and reading of data signals. More specifically, it relates to the system of magnetic recording that utilizes transducers having relative motion with respect to a record medium for generating the fields to record and for sensing the state of recorded magnetic conditions to read. Still more specifically, it relates to a magnetic recording system wherein the record member is held relatively stationary; and, the transducers are caused to move with respect to the record surface, wherein the transducers are mounted in a supporting rotor with the record member being supported on a layer of air in cooperative relation to the transducers in the rotor.

(2) Description of the prior art

The prior art has seen various attempts at recording signals on magnetic record members by utilizing movable transducers. Some of the prior art systems have dealt with the recording of analog signals, as in video recording, while others have dealt with the recording of digital signals, as in data processing systems. Many of the prior art systems have operated with the record member in physical contact with the reading and recording transducers. It has been recognized that the contact-type mode of operation results in a substantial problem of wear for the magnetic record member. To overcome this problem systems have been developed for supporting the record member out of contact with the transducers, by the use of an intermediate layer of air, while maintaining the record member in a relatively close proximity to the transducers for providing appropriate spacing so that reading and recording can be accomplished. It has also been recognized that it is possible for the record member to come into contact with the rotor supporting the transducer during period of start-up and stopping of the system, see the discussion in Ser. No. 695,500 identified above. This type of contacting causes a problem of wear in the magnetic record member as well as on the surface of the supporting rotor unless appropriate steps to safeguard the rotor are taken. This invention overcomes one of these problems in that the hard-coated surface of the rotor substantially eliminates any damage thereto resulting from having the record member come in contact with the peripheral surface of the rotor.

It has also been recognized that the surface of the rotor is extremely important in determining the profile of the magnetic record member with relation to the transducers. This consideration is described in Ser. No. 695,501, identified above, and clearly indicates that the profile of the record member can be controlled by proper spacing of desired deviations in the surface of the rotor at points removed from the transducers. In the prior art it was common to mount the transducer pole pieces in a supporting block and insert the block in channels in the rotor. It was also common to pot the transducer in the supporting block. When the transducers were thus potted and inserted in the rotor the entire assembly was then ground smooth. The primary problem arising, however, was that the material surrounding the pole pieces of the transducers was substantially softer than the material of the supporting rotor. This difference in the consistency of the materials resulted in slight deviations in the surface immediately adjacent the transducers. This resulted in an effect on the profile of the flexible record member that is undesired. This method of assembly also results in a problem wherein the potting material is caused to flow during periods of operation wherein the rotor is subjected to relatively high rates of rotation at elevated temperatures. This invention overcomes these types of problems by providing a hard coated surface at the periphery of the rotors covering all of the supporting apparatus and leaving only the pole pieces of the transducers exposed. A discussion of the flying characteristics of a flexible record member around a rotating transducer supporting rotor, together with the record member profile problems resulting from bowing and anti-elastic curvature of the record member, is set forth in Ser. No. 695,502, identified above.

SUMMARY

The apparatus and method of this invention are for use in a magnetic storage system that employs a plurality of transducers mounted in a rotatable support member, referred to as a rotor. Particularily, the invention is directed to providing a hard surface on the rotor, with the surface material being capable of being polished to a very high degree of smoothness, while exposing only the pole pieces of the reading and recording transducers.

In deriving the desired smooth, durable, homogeneous rotor surface, the transducer assemblies are assembled in a supporting block, and inserted in predetermined locations near the peripheral surface of the rotor with portions of the pole pieces extending above the surface of the rotor. This assembly is then coated with relatively hard metallic material to a depth greater than the protrusion of the pole pieces above the surface of the rotor. Finally, the rotor is ground down a predetermined amount until the pole pieces of the transducers are exposed leaving a substantially smooth and homogeneous surface with the exception of the areas of the transducer pole pieces.

A primary object of this invention, then, is to provide an improved rotor for use in a memory system that utilizes flexible record members in conjunction with transducers mounted in the rotatable rotor. Still another object of this invention is to provide an improved rotor for use in a magnetic storage system, wherein the surface of the rotor is relatively impervious to contact wear resulting from inadvertant contacts of the record member with the surface of the rotor. Still another object of this invention is to provide a hard-surfaced rotor having a durable homogeneous surface that can be smoothed to a high degree of smoothness for aiding in maintaining a proper desired profile for the flexible record member used in conjunction with the rotor. Yet another object of this invention is to provide an improved hard-coated rotor for use in a magnetic memory system, wherein the rotor is rotated at relatively high speeds, for eliminating any flow of potting material in the vicinity of the reading and recording transducers. Still another object of this invention is to provide an improved method of fabricating a hard-coated rotor for use in magnetic memory systems wherein a durable, homogeneous peripheral surface is provided with the exception of the exposed transducer pole pieces.

BRIEF DESCRIPTION OF THE DRAWINGS

The foregoing and other more detailed and specific objectives will become apparent from the following detailed description of the preferred embodiment, when viewd in light of the drawings, in which.

DESCRIPTION OF THE PREFERRED EMBODIMENTS

Figure 1:
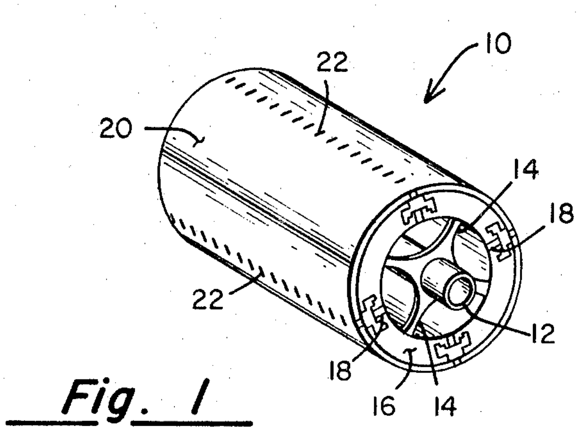
FIG. 1 is a perspective view of the improved hard-surface rotor of this invention.

FIG. 1 is a perspective view of the improved hard-surfaced rotor, generally labeled 10, of this invention. The rotor 10 is arranged for being rotated about axle 12, and has a generally hollow cylindrical interior portion with mounting members 14 supporting the transducer support member 16 to the axle 12. The transducer supporting member 16 is constructed of light weight material, for example aluminum, or the like. The supporting member 16 has one or more head block receiving channels 18 formed therein. For the configuration shown, there are four such channels 18; it being understood that a greater or fewer number of such channels can be utilized. A head arrangement, to be described in more detail below, is fitted with a plurality of transducer pole pieces and windings and inserted in each of the channels 18. A hard coating 20 is formed around the transducer support member 16, and finished by grinding and lapping to a very smooth surface, with the pole pieces 22 of the transducers exposed for cooperating with a magnetic record member (not shown) in a magnetic storage system. In the absence of the hard-coating material 20, a rotating bare aluminum rotor 10 would experience relatively severe damage if the magnetic record member, or any other material, would touch it even for short periods of time. The aluminum surface is subject to imperfections, and cannot be polished to the degree of smoothness required to minimize record member wear. Further, any minor imperfections in the aluminum surface will cause marked changes in the flying profile of associated record members (not shown).

Figure 2:
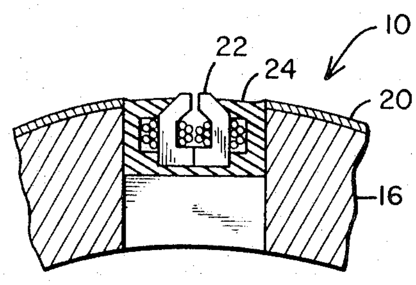
FIG. 2 is a section view of a portion of a rotatable rotor illustrating the lack of surface uniformity in the vicinity of the transducers in the absence of full surface coating.

In FIG. 2 there is shown a section view of a portion of the transducer support portion 16 of a rotor 10 illustrating the surfacing problem and lack of profile uniformity in the vicinity of the transducers 22, resulting from the exposure of the potting material 24, for those systems where the hard coating material 20 is not applied directly over the transducer assembly. This lack of uniformity results when the hard-coat material 20 is ground down for smoothness, with the grinding of the relatively softer potting material 24 proceeding at a more rapid rate than that of the hard-surface material. It is this type of indentations in the vicinity of the transducers 22 that result in improper profile for the record members in the vicinity of the transducers. Further, with the potting material 24 exposed it is subject to a certain degree of flow resulting from the rotation of the rotor 10 in a relatively hot environment. Of course the problem exists for those systems that do not use the hard-coating material 20 but instead attempt to provide a smooth surface directly on the transducer supporting member 16.

Figure 3:
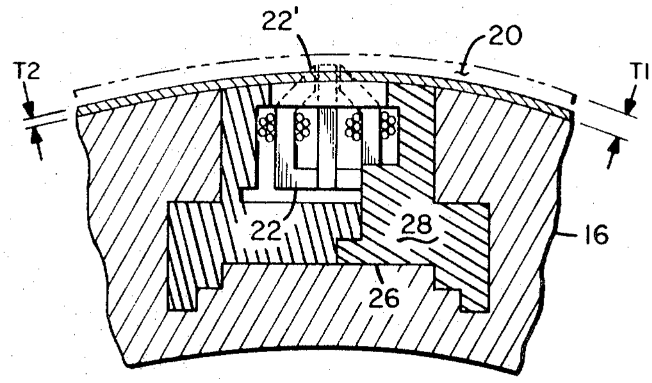
FIG. 3 is a partial section view of a portion of a rotor of this invention illustrating the hard-coating.

FIG. 3 is partial sectioned view of a portion of a rotor 16 having a channel 26 for mounting head supporting block 28. The head supporting block 28 is arranged for holding a plurality of transducer pole pieces 22 in a spaced-apart upright relationship. The transducer pole pieces 22 are assembled into the supporting block 28 prior to being inserted in channel 26. When the transducer pole pieces 22 are assembled the entire assembly is potted. In this arrangement the structure is such that the ends 22′ of the transducer pole pieces 22 extend above the surface of rotor 10. When the transducer mounting blocks 28 are all mounted in the rotor 10, the entire peripheral surface is coated with hard-coating material 20 to a thickness T1, as illustrated by the dashed line. This coating is accomplished by any one of the several hard-coating processes. Two of these hard-coating processes utilize tungsten carbide; one of the processes using tungsten carbide LW–2, and the other process utilizing tungsten carbide LW–5. Application of each of these types of materials can be by a process utilizing a so-called "detonation gun" application process. This process is known and can be readily accomplished. Another process utilizes chrome oxide LC–4, applied by a so-called "plasma torch" method. This method also is known, and can be readily utilized. Yet another method of providing the hard-coating is by an electrolytic process of depositing hard chrome. This process is also known and readily available. Of course any other well known hard-coating process can be utilized wherein a surface coating can be made to adhere to the peripheral surface of the rotor 10. The depth T1 of the hard-coated surface will be in the order of approximately 18 mils, with an additional buildup of material of approximately 2 mils or the like being acceptable. Having thus deposited the material to a thickness T1, the rotor is ground down to a thickness T2. This thickness T2 would normally leave the thickness of hard-coating material on the peripheral surface of the rotor 10 in the order of approximately 10 mils. In the course of grinding the hard-coating material down it will be seen that the peripheral ends 22′ of the pole pieces 22 will also be ground down a very slight amount, and will be completely flush with the peripheral surface of the hard-coating 20.

Figure 4:
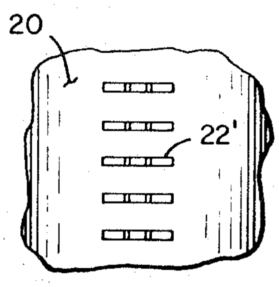
FIG. 4 is a partial face view of a portion of the rotor of this invention illustrating the exposure of only the pole pieces of the transducers.

FIG. 4 is a partial face view of a portion of a rotor of this invention, and illustrates the exposure of only the ends 22′ of the pole pieces through the hard-coated surface 20. It can be seen that the spaces between the ends of the pole pieces 22′ is a continuation of the hard-coated material 20, and that the potting material and the rest of the supporting structure 28 (see FIG. 3) are completely covered. In this way the surface of the rotor can be made completely uniform for aiding in maintaining a proper profile for the associated flexible record member, as described above.

Figure 5:
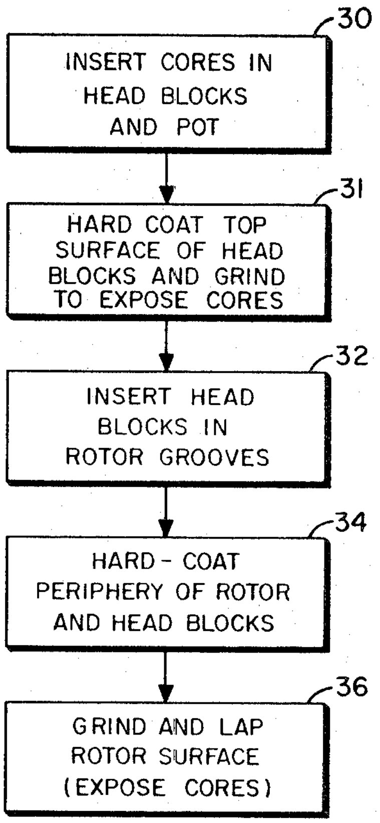
FIG. 5 is a process flow diagram for the method of achieving the hard-coated rotor of this invention.

FIG. 5 is a process flow diagram for the method of achieving the head-coated rotor of this invention. It can be seen that the initial step, as indicated by block 30, is to assemble the transducer pole pieces into the supporting blocks, referred to as inserting the cores in the head block, followed by the potting operation. Having thus assembled the head blocks with the transducers, the next step when using the electrodeposited chrome plate process, as shown by block 31, is to hard coat the peripheral surface of the head blocks and grind the hard coat to expose the top surface of the cores; this step is not required when using the detonation gun or the plasma torch process. This initial hard-coat operation is provided to give a substantially non-porous coating over the head block and potting in the vicinity of the cores and to provide a surface that can subsequently be coated along with the surface of the rotor. These coated head blocks are then ready to be inserted into the grooves machined in the rotor, as indicated by block 32. Having thus inserted the head blocks in the rotor, the entire assembly is subjected to a hard-coating process for hard coating the periphery of the rotor to a depth sufficient to cover the periphery of the rotor surface and the extended tips of the transducer pole pieces, as indicated by block 34. These hard-coating processes can be selected from the detonation gun process, the plasma torch process, or the electrolytic deposition processes described above. Having thus deposited the hard coating material on the rotor, it is now necessary to grind away a portion of the deposited material for exposing the tips of the transducer pole pieces and to lap the entire surface for providing an optimum smoothness, as indicated by block 36.

In conclusion, then, it can be seen from the foregoing detailed description of the preferred embodiments, when viewed in light of the drawings, that the various objectives of the invention have been achieved, and that an improved rotor for use in a magnetic storage system has been described. This improved rotor utilizes a smooth, durable, homogeneous surface on its periphery with only the tips of the transducer pole pieces exposed therethrough. This hard surface will be relatively free of damage due to inadvertent impacting of the surface by cooperating record members while providing an extremely smooth surface that aids in the maintenance of the desired magnetic record member profile when utilized in conjunction with the rotor. It being recognized that various modifications and alterations in arrangement, dimensions, selection of material, or the like, will become apparent to those skilled in the art upon a viewing of the foregoing description, that is intended to be protected by Letters Patent is set forth in the appended claims.

We claim:

1. The method of forming a hard-surfaced rotor for use in a rotating-head magnetic memory system comprising the steps of:

(a) mounting magnetic transducers having pole pieces and a gap therebetween in a cylindrical rotor with a portion of said pole pieces protruding through and beyond the peripheral surface of said rotor;

(b) forming a hard-coating layer of substantially homogeneous material on said peripheral surface and on said pieces to a layer thickness sufficient to cover said portion of said pole pieces protruding beyond the peripheral surface; and (c) removing a sufficient thickness of said substantially homogeneous hard-coating layer of material to expose the tips of said portion of said pole pieces and said gaps.

2. The method of claim 1 wherein the step of removing a sufficient thickness of said substantially homogeneous hard-coating layer of material includes the steps of:

(a) grinding away a predetermined thickness of said hard-coating layer of material to expose said tips of said pole pieces; and (b) lapping the hard-coating layer of material and the exposed tips of said pole pieces to a desired smoothness.

3. The method of forming a hard-surfaced rotor for use in a rotating-head magnetic memory system comprising the steps of:

(a) inserting a plurality of magnetic transducers having pole pieces and a gap therebetween and associated conductor windings in a head block and securing said pole pieces and windings therein with at least a portion of said transducer pole pieces protruding through and above a surface of said head block;

(b) forming a hard-coating layer of substantially homogeneous material on said surface of said head block to a coating thickness sufficient to cover the portion of said transducer pole pieces exposed above said surface of said head block;

(c) removing a sufficient thickness of said hard-coating material to expose the tips of said transducer pole pieces and said gap;

(d) forming at least one slot in a cylindrical rotor for receiving a head block;

(e) inserting the hard-coated head block in said slot;

(f) forming a hard-coating layer of substantially homogeneous material on the periphery of said rotor and said hard-coated head block to a depth to cover the exposed tips of the transducer pole pieces; and (g) removing a sufficient thickness of said hard-coating material from said periphery of said rotor to expose said tips of said pole pieces.

4. The method as in claim 3 wherein said steps of forming a hard-coating layer includes the step of depositing hard-chrome by an electrolytic process.

5. The method of claim 3 wherein the steps of removing a sufficient thickness of hard-coating material includes the steps of:

(a) grinding a predetermined thickness of said hard-coating material away; and (b) lapping the exposed peripheral surface of the hard-coating material and the exposed tips of the pole pieces for achieving desired rotor smoothness.

References Cited

UNITED STATES PATENTS

| | | | |
|---|---|---|---|
| 2,968,702 | 1/1961 | Fay | 179—100.2 T |
| 3,384,954 | 5/1968 | Bradford et al. | 29—603 |
| 3,417,386 | 12/1968 | Schneider | 340—174.1 |
| 3,486,220 | 12/1969 | Braun et al. | 29—603 |

JOHN F. CAMPBELL, Primary Examiner

C. E. HALL, Assistant Examiner

U.S. Cl. X.R.

29—527.2; 179—100.2 T; 340—174.1 f